United States Patent [19]

Biettron

[11] 4,357,831
[45] Nov. 9, 1982

[54] AMBIENT TEMPERATURE CORRECTION DEVICE FOR LIQUID EXPANSION THERMOMETERS

[75] Inventor: Pierre Biettron, Meslay, France

[73] Assignee: Societe de Fabrication des Appareils Bourdon, Paris, France

[21] Appl. No.: 155,759

[22] Filed: Jun. 2, 1980

[30] Foreign Application Priority Data

Jun. 1, 1979 [FR] France ............................. 79 14117

[51] Int. Cl.³ ............................................. G01K 5/38
[52] U.S. Cl. ................................. 374/197; 374/203
[58] Field of Search ..................... 73/368.6, 368, 708

[56] References Cited

U.S. PATENT DOCUMENTS

| | | | |
|---|---|---|---|
| 2,053,974 | 9/1936 | Smith | 73/368.6 |
| 3,715,924 | 2/1973 | Nelson | 73/368 |
| 3,934,479 | 1/1976 | Posnansky | 73/368.6 |

*Primary Examiner*—Charles A. Ruehl
*Assistant Examiner*—Joseph W. Roskos
*Attorney, Agent, or Firm*—Watson, Cole, Grindle & Watson

[57] ABSTRACT

A liquid expansion thermometer which includes ambient temperature correction means in the form of compensation elements located along the length of the thermometer duct and, each compensation element comprising a hollow shell in which is positioned a solid element, and each compensation element acting to compensate for volume changes in an associated duct segment.

11 Claims, 2 Drawing Figures

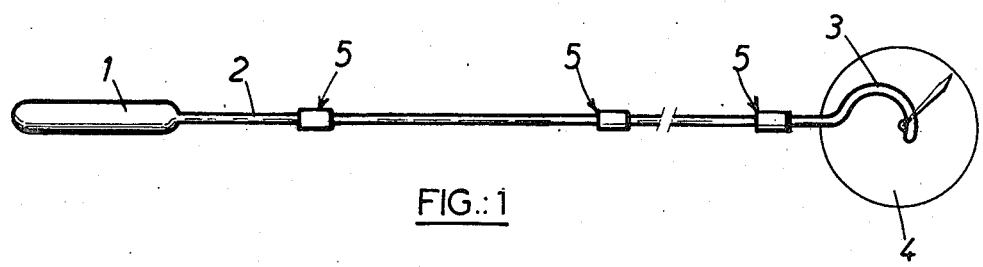
FIG.:1
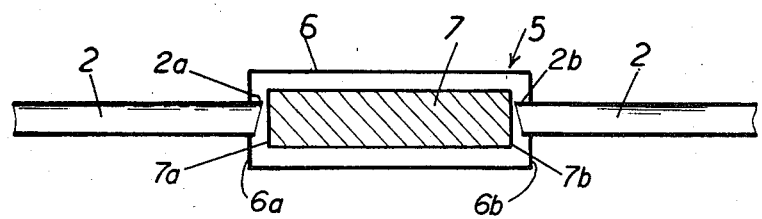
FIG.:2 and the duct to the measuring apparatus an expansible liquid
AMBIENT TEMPERATURE CORRECTION DEVICE FOR LIQUID EXPANSION THERMOMETERS

BACKGROUND OF THE INVENTION

The present invention relates to ambient temperature correction for liquid expansion thermometers with remote reading transmission.

Such thermometers are currently composed of three sections: a bulb located within the medium whose temperature is to be measured, a duct having a length at least equal to the distance at which the reading of the measured temperature is to be forwarded, and a measurement system connected to the display system of the temperature to which the bulb is subjected. The assembly is filled with a liquid of known coefficient of expansion.

The liquid contained in the duct is subjected to the ambient temperature and its volume will vary as a function of the latter; thus, errors in the indication of the temperature of the bulb will result. A means of correction for such errors is required.

A known means of correction for such errors involve introducing into the duct and over its whole length a wire of a very low expansion material such as "Unvar". In accordance with a particular prior art technique, wherein the expansible liquid in the thermometer is mercury, the inner diameter of the duct is about 1.35 mms. and the diameter of the "Invar" wire is 1.2 mms. The annular passage area for the mercury is therefore 0.3 sq.mm. These data lead to the following remarks:

when dealing with ducts of great length (e.g. from 3 to 15 meters) for which compensation is of special interest, it is difficult to introduce a fine wire into a tube of such a small cross-section;

dimensional tolerances are difficult to comply with when dealing with such small diameters and even variations of a few hundredths of a millimeter can considerably vitiate the compensation;

the assembly of the tube (outer diameter of about 4 mms.) and the compensation core is stiffer and less resistant to deformations than a capillary by itself;

the deformations of the duct, which cannot be avoided when fitting the apparatus in stationary units, and even more in movable units, produce variations in tube cross-section and hence in liquid volume, which irretrievably results in false indications of the measured temperature.

The present invention is directed to a liquid expansion thermometer which is based on the of the above-noted type, i.e., one which includes a bulb locatable within the medium whose temperature is to be measured, a measuring apparatus and a duct connecting the bulb to the measuring apparatus an expansible liquid filling the assembly, and which is constructed such that temperature compensation for the liquid in the duct can be achieved in a way which allows the duct to retain its flexibility and which allows the thermometer as a whole to be simply constructed.

SUMMARY OF THE INVENTION

According to the invention at least one temperature compensation element is located in the duct, each compensation device being formed of a hollow shell which defines a greater volume than that of the duct, in which is positioned a solid element which has a smaller volume than that of the hollow shell, the variation in the free volume for liquid left between the hollow element and the solid therein being equal to the variation in the volumes of the duct segment associated with the particular temperature compensation element and of the expansible liquid therein.

BRIEF DESCRIPTION OF THE DRAWINGS

FIG. 1 illustrates a liquid expansion thermometer provided with a number of ambient temperature compensation elements constructed according to the invention.

FIG. 2 is a fragmentary cross-section of a single compensation element with associated duct segment.

DETAILED DESCRIPTION OF THE INVENTION

FIG. 1 shows a liquid expansion thermometer with remote reading transmission, comprising three sections: a bulb 1 located within the medium whose temperature is to be measured, a duct 2 of very small inner diameter, e.g. of about 2/10 mm., connecting the bulb 1 to a measuring system constituted in the illustrated embodiment by a Bourdon gauge 3 associated with a temperature display device 4. The tube 2 includes along its length temperature compensation elements 5. The assembly of the bulb-duct-segments 1,2,5 and measuring system 3 is filled with a liquid of known coefficient of expansion. The choice of the liquid depends on the ranges of temperatures to be measured, and currently alcohol or mercury is used.

FIG. 2 shows a temperature compensation element 5 in the form of a hollow cylindrical shell 6 having end walls 6a, 6b, the shell 6 defining greater diameter than that of the duct 2 or an associated segment thereof, and by a solid element 7 of smaller diameter than that of element 6. The ends 2a, 2b the associated duct segments 2 open into the end walls 6a, 6b of the cylindrical shell 6.

The principle of the compensation consists in equalizing the expansion of the duct and that of the liquid; in other words, the increase in volume of the duct must be equal to the increase in volume of the liquid.

The hollow cylindrical shell 6 must therefore have a higher volume than that of the duct or duct portion associated therewith so that the variation in volume of the duct and of the liquid be equal to the variation in the volume comprised between the solid element 7 and the hollow cylindrical shell 6 for the same variation in ambient temperature.

The relationship between the various volumes will be determined hereafter, assuming that the hollow cylindrical shell 6 and the duct 2 are made of the same material.

Let $V_0$ be the volume of the hollow element 6, $V'_0$ that of the solid element 7 and $v_0$ the volume of the duct or associated duct segment 2 taken at a reference ambient temperature $t_0$, $\alpha$ be the coefficient of linear expansion of $V_0$ and $v_0$, $\beta_1$ that of $V'_0$ and $\beta$ the coefficient of cubic expansion of the filling liquid, at the reference temperature $t_0$, the volume $V_{10}$ of liquid is equal to $V_0 + v_0 - V'_0$.

At an ambient temperature $t_1$ different from $t_0$, the volumes are as follows:

hollow element + duct $$V_1 + v_1 = (V_0 + v_0)[1 + 3\alpha(t_1 - t_0)]$$

solid element $$V_1 = V_0[1 + 3\alpha_1(t_1 - t_0)]$$

liquid $$V_{l1} = V_{l0}[1 + \beta(t_1 - t_0)].$$

The difference between the volume of the container: $V_1 + v_1 - V'_1$, and that of the liquid content: $V_{l1}$, is equal to $$\Delta v = (t_1 - t_0)[(V_0 + v_0)(3\alpha - \beta) - V'_0(3\alpha_1 - \beta)].$$

The error is ambient temperature cancels out when $\Delta v$ cancels, i.e. when $$(V_0 + v_0)(3\alpha - \beta) = V'_0(3\alpha_1 - \beta), \text{ and}$$

$$V'_0 = (V_0 + v_0) \frac{3\alpha - \beta}{3\alpha_1 - \beta}$$

The volume $V'_0$ of the solid element 7 having to be smaller than $V_0 + v_0$, it is necessary that $$\frac{3\alpha - \beta}{3\alpha_1 - \beta} < 1.$$

Now, generally, speaking, coefficient $\beta$ is substantially greater than $3\alpha$ and than $3\alpha_1$, since liquids have coefficient of expansions greater than solid materials. $\alpha_1$ must therefore be substantially smaller than $\alpha$.

When a very low expansion material such as "Invar" is used for the solid element 7, $3\alpha_1$ may be neglected compared with $\beta$.

Moreover the duct diameters are small (0.2 to 0.4 mm.) so that the volume of liquid influenced by ambient temperature be very small. $V_0$ may therefore be selected far greater than $v_0$. The above relation may then be written without important error:

$$V'_0 = V_0\left(1 - \frac{3\alpha}{\beta}\right).$$

For example, if the material of which hollow element 6 is made is stainless steel ($\alpha = 0.000012$) and if the filling liquid is alcohol ($\beta = 0.00117$), $V'_0 = 0.969\ V_0$, i.e. about 97% of $V_0$.

The volume of the solid element 7 must be 97% of the volume of the hollow shell 6.

If the filling liquid is mercury ($\beta = 0.00019$), $V'_0 = 0.81\ V_0$, i.e. 81% of $V_0$.

In both these examples, the solid element 7 is of a material of very low expansion coefficient compared with that of the hollow element 6. This material is selected among the known metals such as nickel steel of the "Invar" type or the ceramics.

The material of the duct 2 is the same as that of the hollow shell 6 in order to facilitate welding. It is possible to use different materials, but it will then be necessary to take into account their coefficients of expansion if they are too different from one another.

In the embodiment illustrated on FIG. 2, the hollow shell 6 and the solid element 7 are cylindrical. However, other shapes can be used. The duct ends 2a 2b have been bevelled in order to allow free flow of the filling liquid through the compensation segment. Other spacing means which eliminate the possibility that the bases 7a or 7b of the solid element 7 will obstruct the ends of the duct 2 extending through the end walls 6a, 6b of the tubular shell 6, are easily conceivable. These means can be carried by the cylinder itself or by the end walls of the cylindrical hollow shell 6. The simplest means consists in letting the duct ends project therein and providing longitudinally extending notches therealong.

In an embodiment of the invention, compensation is carried out by means of small rigid segments formed of tubes of 3.13 mms. inner diameter and 4.6 mms. outer diameter. The cylindrical solid element 7 is formed by an "Invar" rod of 3 mms. diameter. These segments have a length of about 50 mms. and are spaced apart by about 95 cms. of capillary tube length.

The advantages of this new compensation device are notably:

diameters of compensation segments which are more important than in the prior art device with a compensation wire, such diameters allowing less stringent manufacturing tolerances;

a rigidity of the segments sufficient to avoid deformations causing the volume to vary and vitiating the measurements in a permanent manner;

a duct which is flexible as a whole, enabling the capillary parts extending between compensation segments to flex without entailing variations in volume by irreversible deformation;

a duct of practically unlimited length since there is no longer any mechanical difficulty such as for the introduction of a wire over the whole length, nor is there any risk of localized and non-compensated ambient temperature variations.

I claim:

1. In a liquid filled liquid expansion thermometer which includes a bulb for placement in the medium whose temperature is to be measured, a means for providing a temperature reading and a duct connected between the bulb and the means for providing a temperature reading, the improvement wherein said duct includes a number of temperature compensation elements along its length so as to divide the duct into a number of duct sections, each temperature compensation element being associated with a duct section, each temperature compensation element comprising a hollow shell and a solid element therein, each hollow shell defining a greater volume than the volume of the associated duct section and each solid element defining a smaller volume than the volume of the associated hollow shell, the free volume for liquid defined between each hollow shell and the solid element therein changing with temperature equally to the change in volume of the associated duct section and the volume of liquid therein.

2. The liquid expansion thermometer as claimed in claim 1, wherein the various volumes meet the formula:

$$V'_0 = (V_0 + v_0)\frac{3\alpha - \beta}{3\alpha_1 - \beta}$$

in which $V'_0$ is the volume of each solid element, $V_0$ is the volume defined by each hollow shell, $v_0$ is the volume defined by each associated duct section, $\alpha$ is the coefficient of linear expansion of the hollow shell and the associated duct section, $\alpha_1$ is the coefficient of linear expansion of the solid element $\beta$ is the coefficient of cubic expansion of the liquid.

3. The liquid expansion thermometer as claimed in claim 1, wherein the various volumes meet the formula $$V'_0 = V_0 \left(1 - \frac{3\alpha}{\beta}\right)$$

in which $V'_0$ and $V_0$ are the volume of the solid element and of the hollow shell, respectively, and $\alpha$ and $\beta$ are the coefficient of linear expansion of the hollow shell and the associated duct section, and the cubic expansion of the liquid, respectively, when the material of which said solid element is made has a small linear expansion coefficient than that of the material of which said hollow shell is made.

4. The liquid expansion thermometer as claimed in claim 1, wherein each solid element is made of a material of very low coefficient of thermal linear expansion.

5. The liquid expansion thermometer as claimed in claim 4, wherein said material is an "Invar" type nickel steel.

6. The liquid expansion thermometer as claimed in claim 4, wherein said material is a ceramic.

7. The liquid expansion thermometer as claimed in claim 1 wherein each said hollow shell is cylindrical in shape and includes end walls at its opposite ends.

8. The liquid expansion thermometer as claimed in claim 7 wherein each solid element is cylindrical in shape and is spaced from the ends walls of the hollow shell in which it is positioned.

9. The liquid expansion thermometer as claimed in claim 8 wherein ends of the duct sections associated with each temperature compensation element extend through the opposite end walls of each hollow shell.

10. The liquid expansion thermometer as claimed in claim 9 wherein the ends of the duct sections which extend into each associated temperature compensation element are bevelled.

11. The liquid expansion thermometer as claimed in claim 9 wherein the ends of the duct sections which extend into each associated temperature compensation element include longitudinally-extending notches.

* * * * *